United States Patent
Cama

[15] 3,675,666
[45] July 11, 1972

[54] APPARATUS FOR CLEANING METALLIC PARTS

[72] Inventor: Gerardo Cama, Barcelona, Spain
[73] Assignee: Coltex, S.L., Barcelona, Spain
[22] Filed: April 11, 1968
[21] Appl. No.: 720,524

[30] Foreign Application Priority Data

April 13, 1967 Spain ..................................... 129471

[52] U.S. Cl. .................... 134/105, 134/102, 134/113
[51] Int. Cl. ........................................ B08b 3/08, B08b 3/10
[58] Field of Search ................... 134/105, 107, 108, 19, 113, 134/102, 109, 11, 31

[56] References Cited

UNITED STATES PATENTS

| | | | |
|---|---|---|---|
| 1,849,932 | 3/1932 | Johnson et al. | 134/19 X |
| 2,442,272 | 5/1948 | Jaffa | 134/108 |
| 2,994,330 | 8/1961 | Catlin et al. | 134/107 X |
| 3,071,178 | 1/1963 | Howeth | 134/19 X |
| 3,111,952 | 11/1963 | Roehl | 134/105 |
| 3,308,839 | 3/1967 | Barday | 134/107 X |
| 2,006,636 | 7/1935 | Gerlach | 134/105 X |
| 2,443,373 | 6/1948 | Borsoff | 134/31 X |

FOREIGN PATENTS OR APPLICATIONS 109,622 1/1944 Sweden .................................... 134/105

*Primary Examiner*—Robert L. Bleutge
*Attorney*—Holman & Stern

[57] ABSTRACT

Apparatus for cleaning metallic components employed in fabricating plastic synthetic materials of any material adhering to or impregnating the components which includes a tank disposed in an insulated casing and electrical resistances capable of developing temperatures of 100° C. within the tank located adjacent the bottom thereof. A grating above the resistances supports and prevents the components from directly engaging the resistances in and the components are submerged in a treatment solution of chemical substances the tank. Upon activating the resistances, a reaction of the substances causes the dissolution of the material adhering to or impregnating the components thereby fully cleaning the components.

2 Claims, 2 Drawing Figures

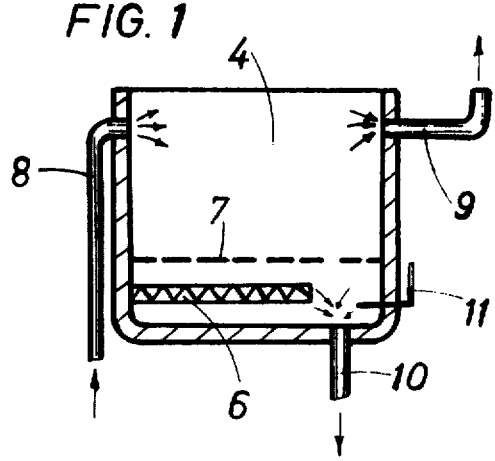
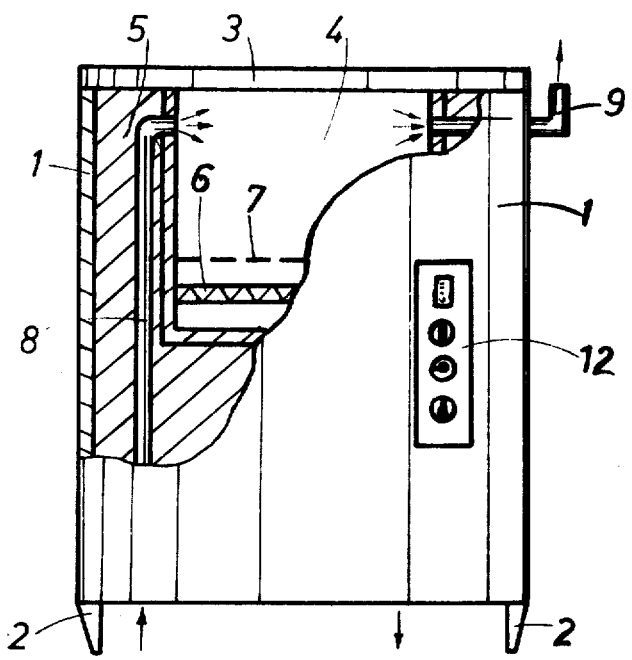

APPARATUS FOR CLEANING METALLIC PARTS

BACKGROUND OF THE INVENTION

The present invention relates to an apparatus for cleaning metallic components, such as dies, heads, filters, etc., employed in fabricating plastic, elastomer, thermoplastic, thermostable or other synthetic resins of any plastic material adhering to or impregnating the components.

Until the present time the cleaning and removal of particles of plastic or thermoplastic materials adhering to the metallic components used in the fabrication of such materials has been an extremely difficult problem to solve. This is due to the particular nature of these materials which makes the removal thereof substantially impossible other than by abrasion and scraping. Also, a flame has been employed, but in the long run such techniques effect the deterioration of the metallic components subjected to the cleaning operations such as the dies, nozzles, filters, etc. Moreover, no product exists which can function as a direct solvent for the materials by simple impregnation or immersion.

SUMMARY OF THE INVENTION

Generally, this apparatus comprises a tank of any configuration and dimensions mounted within an insulated housing or casing with the tank operating at temperatures above 100° C. whereby the essential purposes of the apparatus can be accomplished with maximum safety and efficiency. The object of the present invention is to provide an apparatus for cleaning metallic parts of any particles adhering to or impregnating the components comprises a casing in which a tank adapted to contain the components to be cleaned and a mixture of chemical substances with the tank is located and insulated from the walls of the casing and a cover or lid closes the apparatus.

Electrical resistances are located adjacent the bottom of the tank so that the mixture of chemical substances can attain temperatures above 100° C. for bringing about a reaction of the mixture which causes the dissolution and resultant cleaning of the metallic components deposited in the tank. To prevent the metallic components from contacting the resistances, a grating or false bottom is located in the tank immediately above the electrical resistances.

An air conduit which extends vertically of the casing communicates with the upper end of the tank for enabling air to pass into the interior of the tank during operation and a further conduit leads from the interior of the tank through the casing to a point exteriorly of the casing for facilitating the escape of fumes which develop within the tank.

A pyrometer or thermometer is provided for the bottom of the tank for controlling and ascertaining at any time the temperature attained in the interior of the tank. A drainage conduit for the mixture of chemical substances leads from the tank to the exterior of the casing.

Further objects and advantages of the invention will become more fully apparent to persons skilled in the art from the following detailed description and annexed drawings in which drawings:

BRIEF DESCRIPTION OF THE DRAWINGS

FIG. 1 is a view partly in vertical section and partly in elevation of the tank in which the components to be cleaned are deposited, and FIG. 2 is a view partly in elevation and partly in cross-section of the entire apparatus.

DETAILED DESCRIPTION OF THE INVENTION

Referring to the drawings it will be seen that the apparatus includes a casing or housing 1 of any configuration and dimensions having supported legs 2 and an upper end adapted to be closed by a cover or lid 3. A treatment tank 4 is mounted within the casing 1 and separated from the walls of the casing by means of insulation panels 5.

Electrical resistances 6 are located in proximity to the bottom wall of the tank 4 and a grating or false bottom 7 is positioned within the tank immediately above the electrical resistances 6. It will be appreciated that the grating 7 will prevent the metal components to be cleaned from engaging or contacting the resistances 6.

A conduit 8 extends vertically of the casing 1 and communicates at its upper end with the interior of the tank 4 while the lower end thereof is adjacent the bottom of the casing for enabling air to be admitted into the tank 4 during operation of the apparatus. A second conduit 9 communicates with the interior of the tank 4 as indicated at 9A and the conduit 9 extends to a point exteriorly of the casing 1 and is bent upwardly at its free end to enable any fumes or vapors which develop in the tank 4 to escape to the atmosphere.

A drainage conduit 10 leads from the bottom of the tank 4 to a point outside of the casing 1. In addition, a pyrometer or thermometer 11 is operably associated with the bottom of the tank 4 for indicating the temperatures attained or reached within the tank 4.

A control panel 12 with switches, pilots, a thermostat, etc., is provided on the outer wall of the casing 1 as clearly illustrated in FIG. 2.

While the operation of the cleaning apparatus is believed to be readily apparent from the above description, such operation may be summarized as follows:

A mixture of the chemical substances is introduced into the tank together with the metallic components to be cleaned with such components resting on the grating 7 and being submerged in the treatment solution. The cover or lid 3 is then placed in position on the upper end of the casing and the electrical resistances 6 are activated and so adjusted that a temperature in excess of 100° C. develops in the interior of the tank 4. This temperature effects a reaction of the treatment mixture which causes the dissolution of the synthetic materials adhering to or impregnating the components under treatment thereby resulting in a complete cleaning of such components.

It will be readily appreciated from the above that the present apparatus is quite simple as to structural detail, easy and convenient to handle so that in combination with a suitable mixture or solution of chemical substances a perfect cleaning of the metallic components having particles either adhered to or impregnated in therein are fully cleaned.

This invention is not to be confined to any strict conformity to the showings in the drawings but changes or modifications may be made therein so long as such changes or modifications mark no material departure from the sphere and scope of the invention.

What I claim is:

1. An apparatus for cleaning metallic components employed in the fabrication of synthetic resins of any resin adhering to or impregnating the components, comprising a casing, an imperforate tank within the casing, insulation between the tank and casing, a grating within the tank spaced above the bottom of the tank for supporting the components to be cleaned, a chemical treatment solution within the tank in which the grating and components thereon are submerged, and electrical resistances within the tank below the grating for developing a temperature within the tank above 100° C. thereby effecting a reaction of the solution for dissolving the resin adhering to or impregnating the components thus cleaning the components, with said grating preventing the metallic components from contacting the resistances, a first conduit extending from the bottom of the casing heightwise through said insulation to the upper interior of the tank for introducing air into the tank above the grating, and a second conduit diametrically opposite said first conduit leading from the interior of the tank through the insulation to a point exteriorally of the casing for the discharge of fumes and vapors produced, during operation of the apparatus.

2. The cleaning apparatus as claimed in claim 1 including a third conduit leading from the bottom of the tank through the insulation to the bottom of the casing serving as a drain for the treatment solution.

* * * * *